Patented Sept. 15, 1936

2,054,736

UNITED STATES PATENT OFFICE 2,054,736

ALCOHOLIC FERMENTATION OF SUGAR-CONTAINING LIQUIDS

Firmin Boinot, Melle, Deux-Sevres, France, assignor to Usines De Melle, Melle, Deux-Sevres, France, a corporation of France No Drawing. Application February 1, 1933, Serial No. 654,759. In France February 12, 1932

5 Claims. (Cl. 195—110)

When a sugar liquor is inoculated with a small quantity of yeast and the medium is protected from infective organisms, either by asepsis or by antisepsis, a certain time elapses during which no fermentative manifestation is perceived.

During this period, called "period of incubation", the yeast that has been added exercises principally vegetative functions and multiplies itself. Then alcoholic fermentation appears, progresses and folows its normal course up to the complete conversion of the sugar contained in the medium.

During a part of the process the yeast multiplies (or propagates) and causes fermentation, concurrently: when, however, the concentration of yeast cells has reached a certain limit, (which may be of the order of 10 kilograms of yeast, having 75% of water, to 1000 litres of sugar liquor) and which is hereinafter termed, in this specification and in the appended claims, the "specific cellular saturation" of the yeast, (and which is limited by the requirement, that each cell possesses, of reserving for itself a certain field of action for carrying out its diastasic functions to the maximum extent), the propagation of yeast cells ceases.

If, at this moment, a new volume of fresh sugar liquor is introduced into the mass undergoing fermentation, it is quite evident that the state of cellular saturation is destroyed and that new yeast cells will be born in order to re-establish it. This is what takes place in the practice of what is called "continuous" industrial fermentation which has been employed for a long time.

It is therefore clear that whatever be the manner of carrying out the fermentation that has been employed up to the present, there is always a concurrent formation of alcohol and of yeast.

Now it is known, ever since Pasteur's work on alcoholic fermentation, that the formation of yeast involves a certain consumption of sugar, which thus necessarily escapes being converted into alcohol. This consumption, which is called "constructive" consumption, ordinarily varies from 3 to 6% of the weight of the sugar initially used. In some cases, it is larger.

The present invention has for object the suppression of this "constructive" consumption of sugar. It has been ascertained that hitherto nothing in fact has been tried industrially to obtain this suppression, the favourable repercussion of which on the final alcoholic yield is seen immediately. On the contrary, manufacturers have the custom of increasing the proliferation of the yeast by aeration. In order to obtain this suppression, the method to be followed in accordance with the present invention, consists in maintaining constant the specific cellular saturation of the yeast, after this saturation has once for all been attained, by allowing the fermentation to be continued to the end, removing all the yeast that is present in the liquid, and using this yeast again for the fermentation of a fresh volume of liquor such that the total resultant volume is equal to the first.

One mode of carrying the invention into effect will now be particularly described.

A closed vessel is suitably charged with sugar liquor. Then the fermentation is started by known means.

As soon as the fermentation has ceased all the yeast is removed from the liquor and is used again for the fermentation of a fresh volume of liquor such that the resultant total volume is equal to the first volume. On working in this manner, the fermentation revives very rapidly with its maximum activity without any appreciable formation of new yeast cells, since the specific cellular saturation has been reached.

The removal of the yeast from the liquor of the first fermentation is effected by known means—for example, filtration, centrifuging or precipitation. The second fermentation having been achieved, the same operation can be recommenced for a third fermentation and so on for a large number of times, but the scope of the invention will not be departed from by limiting the number of times, for example to five or to ten, after which it may be judged preferable to make a new provison of young cells.

If a vat containing 500 hectolitres of sugar beet having 10% of saccharose is fermented in accordance with the ordinary practice it is known that its industrial yield of alcohol will be 61 to 62 litres of 100° G. L. alcohol per 100 kgs. of saccharose. If Pasteur's theoretical yield were obtained it would not exceed 64.3 litres of 100° G. L. alcohol per 100 kgs. of saccharose.

Now, according to the present invention it is possible to withdraw by a well regulated centrifuging all the vat yeast that has thus been fermented, which yeast will be contained in a volume representing 5 to 7% of the initial liquid.

On adding this withdrawn yeast in another vat to a volume of fresh sugar beet juice, such that the total resultant volume is equal to the first volume, and on mixing well, a new vigorous fermentation will be obtained which is practically produced with the sole aid of the yeast cells from the first fermentation, and there will thus be obtained a yield of alcohol amounting to 65.5 litres—67.5 litres of 100° G. L. alcohol for 100 kgs. of saccharose.

It is quite evident that it would be possible to take by way of example any sugar-containing liquid coming from any alcoholigenic initial material, even if it requires a preliminary saccharifying operation.

The details of carrying out the invention indicated above and the examples chosen are naturally not limitative of the invention.

The method forming the subject matter of the invention may favourably be supplemented by increasing or prolonging the fermentative activity of the yeast in the course of the fermentations conducted as hereinbefore indicated.

The yeast may be given a supply of nitrogenous nutrient in the form that it prefers—for example in the form of amino acids. As examples of such amino acids may be mentioned glycocoll, aspartic acid, and glutamic acid; but all amino acids are suitable as nitrogenous nutrients for the purpose.

In the same way, it may be found to be suitable to add phosphoric acid to it in a particular form for example, in the condition of an organic complex.

Finally, it may be found to be advantageous for the yield of alcohol first to de-aerate the liquor to be fermented by injection of a gas that is unfit for respiration—e. g., $CO_2$, nitrogen, or hydrogen.

These means or analogous means contribute to the increase of the yield of the operation.

What I claim is:—

1. A method of increasing the yield of alcohol in a sugar fermentation process, comprising preliminarily inoculating a sugar liquor containing nutrients necessary for yeast growth with a yeast, the resulting medium constituting a preliminary batch, keeping the volume of liquor constant while the yeast completes propagation, continuing the fermentation process, then removing all of the yeast from the fermented liquor, and adding said yeast to a second batch of sugar liquor of substantially the same composition as the initial liquor and of such quantity that the resultant total volume of liquor and yeast is substantially equivalent to the volume of the preliminary batch, so that the yeast is at a concentration such that further propagation is inhibited, fermenting the liquor of said second batch by said yeast, and continuing the fermentation to completion, substantially none of the sugar of said second batch being used to facilitate propagation of the yeast.

2. A method of increasing the yield of alcohol in a sugar fermentation process, comprising preliminarily inoculating a sugar liquor containing nutrients necessary for yeast growth with a yeast, the resulting medium constituting a preliminary batch, keeping the volume of liquor constant while the yeast completes propagation, continuing the fermentation process, then removing all of the yeast from the fermented liquor, and adding said yeast to a second batch of sugar liquor of substantially the same composition as the initial liquor and of such quantity that the resultant total volume of liquor and yeast is substantially equivalent to the volume of the preliminary batch, so that the yeast is at a concentration such that further propagation is inhibited, fermenting the liquor of said second batch by said yeast, continuing the fermentation to completion, removing all the yeast from said second batch, and repeating the fermentation cycle by said yeast with new sugar liquor batches of substantially the same composition and quantity as the preceding batch, as many times as desired, with substantially none of the sugar being used to produce new yeast cells in the sugar liquor batches subsequent to said preliminary batch.

3. A process according to claim 2 in which the nutrients contain amino-acids.

4. A process according to claim 1 in which each batch of sugar liquor is first de-aerated by injection of a gas unfit for respiration.

5. A process according to claim 1 in which each batch of sugar liquor is first de-aerated and by injecting into the liquor a gas selected from the group consisting of nitrogen, carbon dioxide and hydrogen.

FIRMIN BOINOT.